2,869,397

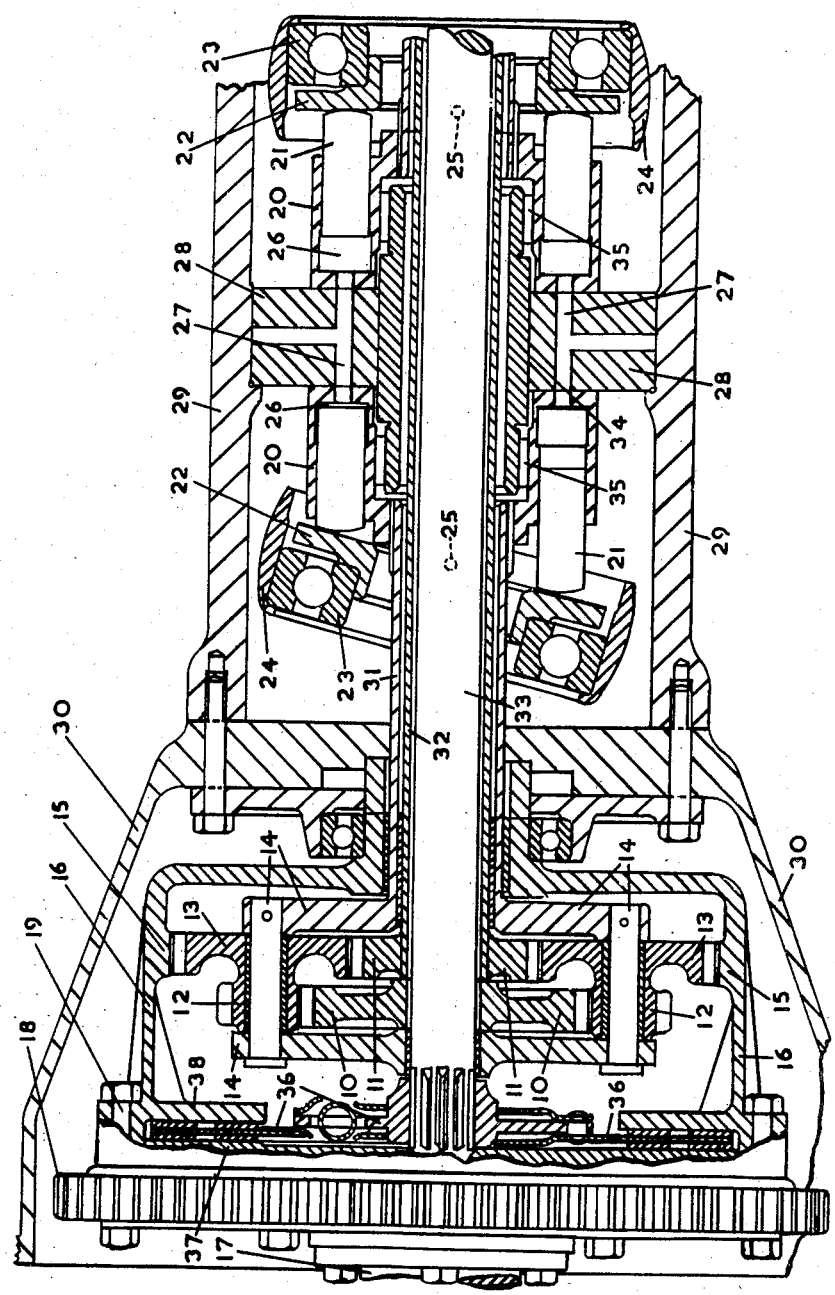

HYDRO-MECHANICAL VARIABLE SPEED TRANSMISSION GEARING

John H. Weaving, Knowle, and Duncan J. K. Stuart, Birmingham, England, assignors to The Austin Motor Company Limited, Birmingham, England Application April 3, 1956, Serial No. 575,800

Claims priority, application Great Britain April 4, 1955

3 Claims. (Cl. 74—687)

This invention relates to hydro-mechanical variable speed gearing, more particularly for automobile transmission systems, of the type in which a hydrostatic drive unit, as distinguished from a hydrokinetic drive unit, is combined with a mechanical change-speed gear so as to bridge the ratio steps thereof and provide an infinitely variable speed ratio, and corresponding variable torque ratio, over a wide range between the input and output shafts with a minimum loss of power in the transmission itself.

In a hydro-mechanical variable speed gearing of the type referred to and according to the present invention, the hydrostatic drive unit is combined with a mechanical change-speed gear of the epicyclic type and with a clutch, the arrangement being such that at two values in the overall speed ratio range there is no pumping of fluid in the hydrostatic drive unit, so that at either of those values the engine work is transmitted wholly by the epicyclic gearing, and that at a third value, which will normally correspond to the 1:1 speed ratio condition, the hydrostatic drive unit can be completely unloaded and mechanically locked-up by application of the clutch. The two particular values at which there is no pumping action or transfer of fluid in the hydrostatic unit will not normally correspond to limiting values but will be so located within the speed ratio range that the average transmission of power through the hydrostatic unit over the full speed ratio range will be a minimum.

The invention will now be more fully described with reference to the embodiment, illustrated in diametrical section in the accompanying drawing, as applied to a hydromechanical variable speed gear for an automobile transmission.

Referring to the drawing, the mechanical change-speed gear of the epicyclic type consists of a single compound train comprising two separate sun wheels 10 and 11 meshing with sets of planetary pinions 12, 13 respectively on a carrier 14 which is common to both sets, and an internal ring gear 15 which meshes with the planetary pinions 13 and is cut in a hollow input shaft or member 16, said input member being positively driven in rotation from the engine crank shaft 17 through a flywheel 18 to which it is secured by bolts 19.

The hydrostatic drive unit comprises two axially aligned cylindrical drums 20 each formed with an annular series of cylindrical bores in which pistons 21 are mounted to slide, and the pistons 21 of each cylinder drum 20 co-operate with one of a pair of plates 22 which are rotatably mounted by bearings 23 in carriers 24 which are tiltable about fixed pivots 25, the arrangement being such that the plates 22 are inclinable to give a variable displacement characteristic when there is relative rotation between either cylinder drum 20 and the plate 22 with which its pistons 21 co-operate.

The working spaces 26 of the cylinders in the two drums are hydraulically connected through transfer ports 27 in an intermediate distributory member 28 which is fixed in relation to the pivots 25 upon which the carriers 24 of the inclinable plates 22 are mounted, so that there can be no relative rotation between said distributory member 28 and pivots 25. In this construction, a rigid mechanical connection between the pivots 25 and distributory member 28 is afforded by a tubular casing 29 in which these parts are fixed and which houses the hydrostatic drive unit, said casing 29 being bolted to a main casing 30 which houses the epicyclic change-speed gear and is fixed to the engine.

The planet carrier 14 is rigidly connected by a tubular shaft 31 to one of the cylinder drums 20, and the sun wheel 11 is rigidly connected by a concentric tubular shaft 32 to the other cylinder drum 20, whilst the sun wheel 10 is fixed to an output shaft 33 which extends axially through the concentric tubular shafts 31, 32 and a bearing supporting sleeve member 34 carried by the distributory member 28 and about the opposite ends of which the cylinder drums 20 rotate on needle roller bearings 35.

Splined upon the output shaft 33 is one plate member 36 of a hydraulically operated friction clutch, the other or pressure plate 37 of which is slidably keyed or splined in the mouth of the hollow input shaft or member 16 which is formed with an inwardly directed flange 38 constituting an abutment, the arrangement being such as to give a straight-through positive mechanical drive when the clutch is engaged. A conical type friction clutch may be employed instead of one of the plate type.

Variable speed ratios between the input shaft or member 16 and the output shaft 33 are obtained by varying the angular dispositions of the inclinable plates 22 and, except when either of these is at right angles to the common axis of the cylinder drums 20 or when the clutch is engaged, the engine torque is transmitted partly by the epicyclic gearing and partly by hydraulic pressure acting between the opposed pistons 21 of the two cylinder drums, one of which operates as a hydraulic motor and the other as a hydraulic pump.

In either of the two positions (one of which is shown) in which one or other of the inclinable plates 22 is at right-angles to the common axis of the cylinder drums 20, no pumping action or transfer of hydraulic fluid takes place and, if the clutch remains disengaged, the engine work is transmitted wholly through the epicyclic gearing. These two positions in which there is no transfer of fluid in the hydrostatic unit will not normally correspond to limiting values but will be so located within the speed ratio range that the average transmission of power through the hydraulic unit over the full speed ratio range will be a minimum.

In a third position, normally corresponding to the 1:1 ratio condition, the clutch can be engaged so that the hydrostatic unit is thereby completely unloaded and mechanically locked-up, and friction and hydraulic losses are minimised and maximum efficiency will obtain.

It will be appreciated that with the above described arrangement, reverse ratios may also be obtained by appropriate adjustment of the inclinable plates, and, therefore, that all the requisite functions of an automotive transmission are provided for with high efficiency.

Having fully described our invention, what we claim and desire to secure by Letters Patent is:

1. A hydro-mechanical variable speed gearing between an input shaft connected to an engine and an output shaft comprising in combination a hydrostatic drive unit, a mechaical change speed gear of the epicyclic type and a clutch between the input and output shafts, said hydrostatic drive unit being adjustable so that at two values in the overall speed ratio range there is no pumping of fluid in the hydrostatic drive unit and the engine work is transmitted wholly by the epicyclic gearing, and means for engaging the clutch at a third value in the speed ratio range normally corresponding to a 1:1 speed ratio condition to drive said output shaft directly by said input shaft with the hydrostatic unit being thereby completely unloaded and mechanically locked up.

2. A hydro-mechanical variable speed gearing as claimed in claim 1, wherein the two values at which there is no pumping of fluid in the hydrostatic unit are not limiting values and are so located in the speed ratio range that the average tranmission of power through the hydrostatic unit over the full speed ratio range will be a minimum.

3. A hydro-mechanical variable speed transmission, particularly an automobile transmission of the type referred to, comprising in combination, an epicyclic gear consisting of a single compound train comprising two separate sun wheels meshing with sets of planetary pinions on a carrier common to both sets, and an internally cut ring gear which meshes with one of said sets of planetary pinions and is attached to the input member of the transmission system; a hydrostatic drive unit consisting of two axially aligned cylindrical drums each formed with an annular series of cylindrical bores fitted with sliding pistons, a pair of plates inclinable about pivots and co-operating with the pistons of the respective cylinder drums to give a variable displacement characteristic when there is relative rotation between either cylinder drum and the inclinable plate with which its pistons co-operate, and an intermediate distributory member mechanically connected rigidly to said pivots and having transfer ports hydraulically connecting the working spaces of the cylinders in the two cylinder drums; a rigid shaft connecting the planet carrier to one of the cylinder drums; a co-axial rigid shaft connecting the other cylinder drum to the sun wheel which meshes with that set of planetary pinions which is in mesh with the said ring gear; a third co-axial shaft which constitutes the output shaft and carries the other or second sun wheel, and a friction clutch which when engaged directly connects the input shaft or member to said output shaft.

References Cited in the file of this patent
UNITED STATES PATENTS

| | | |
|---|---|---|
| 1,951,345 | Centervall | Mar. 20, 1934 |
| 2,296,929 | Ifield | Sept. 29, 1942 |

FOREIGN PATENTS

| | | |
|---|---|---|
| 692,056 | Great Britain | May 27, 1953 |